US011442665B2

(12) United States Patent
Balakrishnan et al.

(10) Patent No.: US 11,442,665 B2
(45) Date of Patent: *Sep. 13, 2022

(54) STORAGE SYSTEM AND METHOD FOR DYNAMIC SELECTION OF A HOST INTERFACE

(71) Applicant: Western Digital Technologies, Inc., San Jose, CA (US)

(72) Inventors: Rakesh Balakrishnan, Bengaluru (IN); Eldhose Peter, Bengaluru (IN); Shiva K, Bengaluru (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/178,447

(22) Filed: Feb. 18, 2021

(65) Prior Publication Data

US 2022/0179586 A1 Jun. 9, 2022

Related U.S. Application Data

(60) Provisional application No. 63/121,602, filed on Dec. 4, 2020.

(51) Int. Cl.
*G06F 3/06* (2006.01)
(52) U.S. Cl.
CPC .......... *G06F 3/0659* (2013.01); *G06F 3/064* (2013.01); *G06F 3/0604* (2013.01); *G06F 3/0658* (2013.01); *G06F 3/0683* (2013.01)

(58) Field of Classification Search
None
See application file for complete search history.

(56) References Cited

U.S. PATENT DOCUMENTS

| 8,151,037 | B1 | 4/2012 | Zhou et al. |
|---|---|---|---|
| 8,478,916 | B2 | 7/2013 | Asnaashari |
| 8,589,723 | B2 | 11/2013 | Kumar et al. |

(Continued)

FOREIGN PATENT DOCUMENTS

| CN | 203224819 U | 10/2013 |
|---|---|---|
| CN | 107092570 A | 8/2017 |

(Continued)

OTHER PUBLICATIONS

Final Office Action dated Sep. 7, 2021 for U.S. Appl. No. 16/910,869.

(Continued)

*Primary Examiner* — Kevin Verbrugge
(74) *Attorney, Agent, or Firm* — Crowell & Moring LLP

(57) ABSTRACT

A storage system and method for dynamic selection of a host interface are provided. In one embodiment, a storage system is provided comprising a memory and a controller. The controller is configured to receive, from a host, a selection of a first host interface; in response to receiving the selection of the first host interface, implement the first host interface; after the first host interface has been implemented, receive, from the host, a selection of a second host interface; and in response to receiving the selection of the second host interface, implement the second host interface even though the first host interface was previously implemented. Other embodiments are provided.

20 Claims, 7 Drawing Sheets

(56) References Cited

U.S. PATENT DOCUMENTS

| | | | |
|---|---|---|---|
| 8,874,820 B2 | 10/2014 | Oh et al. | |
| 8,943,234 B1 | 1/2015 | Voorhees et al. | |
| 10,452,596 B2 | 10/2019 | Carey | |
| 2003/0110340 A1 | 6/2003 | Butler | |
| 2004/0083285 A1 | 4/2004 | Nicolson | |
| 2004/0083308 A1 | 4/2004 | Sebastian | |
| 2010/0023669 A1 | 1/2010 | Lee | |
| 2010/0185808 A1 | 7/2010 | Yu et al. | |
| 2011/0040924 A1 | 2/2011 | Selinger | |
| 2011/0060867 A1* | 3/2011 | Jung | G06F 3/0635 711/E12.001 |
| 2012/0128107 A1 | 5/2012 | Oren | |
| 2012/0260007 A1 | 10/2012 | Jibbe | |
| 2013/0318513 A1* | 11/2013 | Chu | G06F 8/654 717/168 |
| 2015/0154108 A1 | 6/2015 | Gorobets | |
| 2016/0259597 A1 | 9/2016 | Worley et al. | |
| 2016/0274803 A1 | 9/2016 | Earhart | |
| 2016/0328347 A1 | 11/2016 | Worley | |
| 2017/0123707 A1 | 5/2017 | Carey | |
| 2018/0004688 A1 | 1/2018 | Chung | |
| 2018/0113776 A1 | 4/2018 | Lee et al. | |
| 2019/0138440 A1 | 5/2019 | Lee | |
| 2019/0146695 A1 | 5/2019 | Kim | |
| 2019/0187923 A1* | 6/2019 | Kim | G06F 3/061 |
| 2019/0303147 A1 | 10/2019 | Brewer | |
| 2020/0233595 A1* | 7/2020 | Hsieh | G06F 13/4221 |
| 2020/0233818 A1* | 7/2020 | Hsieh | G06F 13/1668 |
| 2020/0243511 A1* | 7/2020 | Gupta | H01L 27/0255 |
| 2021/0157525 A1 | 5/2021 | Seo | |
| 2021/0157526 A1 | 5/2021 | Kwon | |
| 2021/0173785 A1 | 6/2021 | Jin | |
| 2021/0216469 A1 | 7/2021 | Park | |
| 2021/0243080 A1 | 8/2021 | Brewer | |
| 2021/0382621 A1* | 12/2021 | Muthiah | G06F 3/0679 |

FOREIGN PATENT DOCUMENTS

| | | | | |
|---|---|---|---|---|
| CN | 206557760 U | | 10/2017 | |
| GB | 2405714 A | * | 3/2005 | G06F 13/385 |
| JP | 2022049882 | * | 3/2022 | G06F 12/06 |
| TW | 202105228 A | * | 2/2021 | |
| WO | WO 2018233222 A1 | | 12/2018 | |
| WO | WO-2021200926 A1 | * | 10/2021 | |

OTHER PUBLICATIONS

First Action Interview Pilot Program Pre-Interview Communication dated Aug. 10, 2021 for U.S. Appl. No. 16/853,233.

U.S. Appl. No. 16/853,233, filed Apr. 20, 2020, entitled "Dynamic Memory Controller and Method for Use Therewith."

U.S. Appl. No. 16/910,869, filed Jun. 24, 2020, entitled "Dual-Interface Storage System and Method for Use Therewith."

Non-final Office Action dated Apr. 9, 2021 for U.S. Appl. No. 16/910,869.

International Search Report completed May 19, 2021 for International Application No. PCT/US2021/016522.

Written Opinion completed May 19, 2021 for International Application No. PCT/US2021/016522.

Israel Patent Office Search Strategy completed May 5, 2021 for International Application No. PCT/US2021/016522.

* cited by examiner

STORAGE SYSTEM AND METHOD FOR DYNAMIC SELECTION OF A HOST INTERFACE

CROSS-REFERENCE TO RELATED APPLICATION

This application claims the benefit of U.S. provisional patent application No. 63/121,602, filed Dec. 4, 2020, which is hereby incorporated by reference.

BACKGROUND

A memory controller in a storage system can be implemented as an application-specific integrated circuit (ASIC) and often has a memory interface for communicating with a memory of the storage system and a host interface for communicating with a host (e.g., for receiving read/write commands and associated data from the host). The memory interface and the host interface can be designed to work with a specific protocol or standard.

DETAILED DESCRIPTION

Overview

Figure 1A:
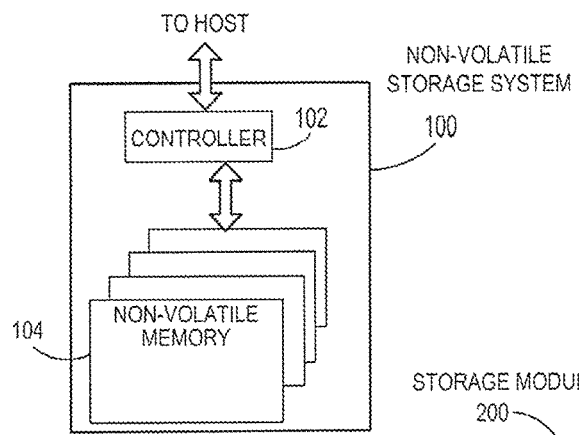
FIG. 1A is a block diagram of a non-volatile storage system of an embodiment.

By way of introduction, the below embodiments relate to a storage system and method for dynamic selection of a host interface. In one embodiment, a storage system is provided comprising a memory and a controller. The controller is configured to receive, from a host, a selection of a first host interface; in response to receiving the selection of the first host interface, implement the first host interface; after the first host interface has been implemented, receive, from the host, a selection of a second host interface; and in response to receiving the selection of the second host interface, implement the second host interface even though the first host interface was previously implemented.

In some embodiments, the storage system further comprises a host interface module configured to receive, from the host, selections of the first and second host interfaces.

In some embodiments, a processor in the controller is configured to implement the first host interface by executing firmware for the first host interface and is further configured to implement the second host interface by executing firmware for the second host interface.

In some embodiments, the memory is configured to be partitioned into a first set of blocks allocated for the first host interface and a second set of blocks allocated for the second host interface.

In some embodiments, the memory comprises a three-dimensional memory.

In some embodiments, the controller is further configured to complete an in-progress memory operation using the first host interface before implementing the second host interface.

In some embodiments, one of the first and second host interfaces comprises a Secure Digital (SD) interface and the other of the first and second host interfaces comprises a peripheral component interconnect express (PCIe) interface.

In some embodiments, the storage system further comprises a connector compatible with the first and second host interfaces.

In some embodiments, the controller is further configured to switch between the first and second host interfaces a plurality of times.

In some embodiments, the selection of the second host interface is received as a vendor-specific command.

In some embodiments, the controller is further configured to send an acknowledgement to the host of receipt of the selection of the second host interface.

In some embodiments, the host comprises an application layer, a driver layer, and a physical layer, and wherein the storage system comprises a physical layer, a command layer, and a controller back-end layer.

In another embodiment, a method is presented that is performed in a host in communication with a storage system comprising a memory. The method comprises sending a command to the storage system to cause the storage system to operate using a first host interface; and after the storage system is operating in the first host interface, sending a command to the storage system to cause the storage system to operate using a second host interface.

In some embodiments, one of the first and second host interfaces comprises a Secure Digital (SD) interface and the other comprises a peripheral component interconnect express (PCIe) interface.

In some embodiments, the command to cause the storage system to operate using the second host interface is sent as a vendor-specific command.

In some embodiments, the host determines whether to use the first host interface or the second host interface based on power usage.

In some embodiments, the host determines whether to use the first host interface or the second host interface based on bandwidth.

In some embodiments, the method further comprises sending commands to switch between the first and second host interfaces a plurality of times.

In some embodiments, the host comprises an application layer, a driver layer, and a physical layer, and wherein the storage system comprises a physical layer, a command layer, and a controller back-end layer.

In another embodiment, a storage system is provided comprising: a memory; a first host interface; a second host interface; and means for switching between the first and second host interfaces in response to a command from a host.

Other embodiments are possible, and each of the embodiments can be used alone or together in combination. Accordingly, various embodiments will now be described with reference to the attached drawings.

Embodiments

Figure 1B:
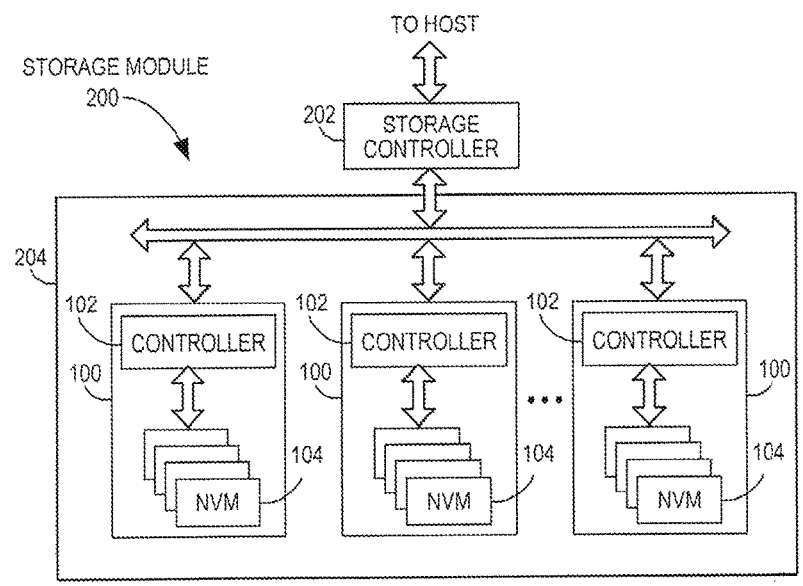
FIG. 1B is a block diagram illustrating a storage module of an embodiment.
Figure 1C:
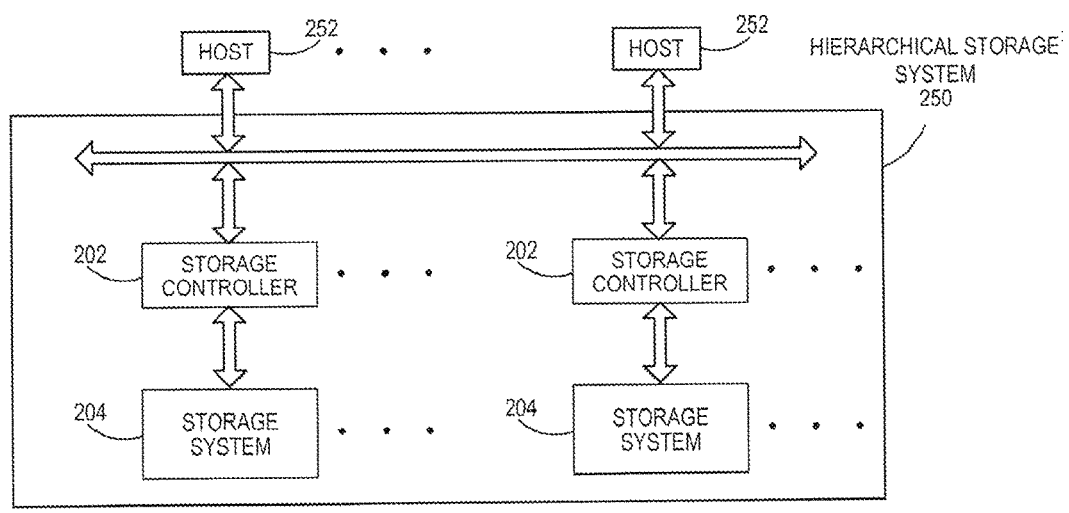
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
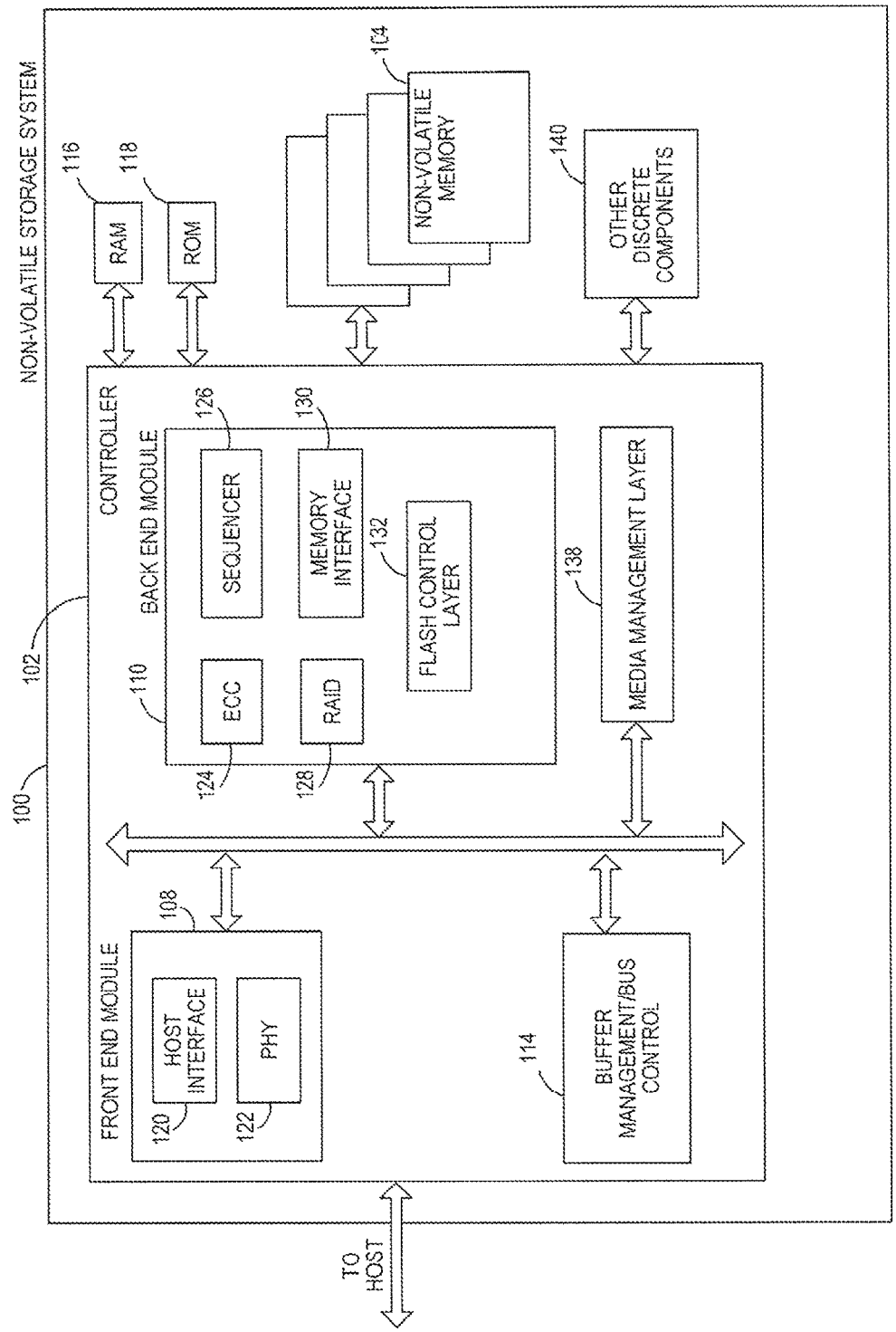
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually per-forms a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SD, PCIe, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
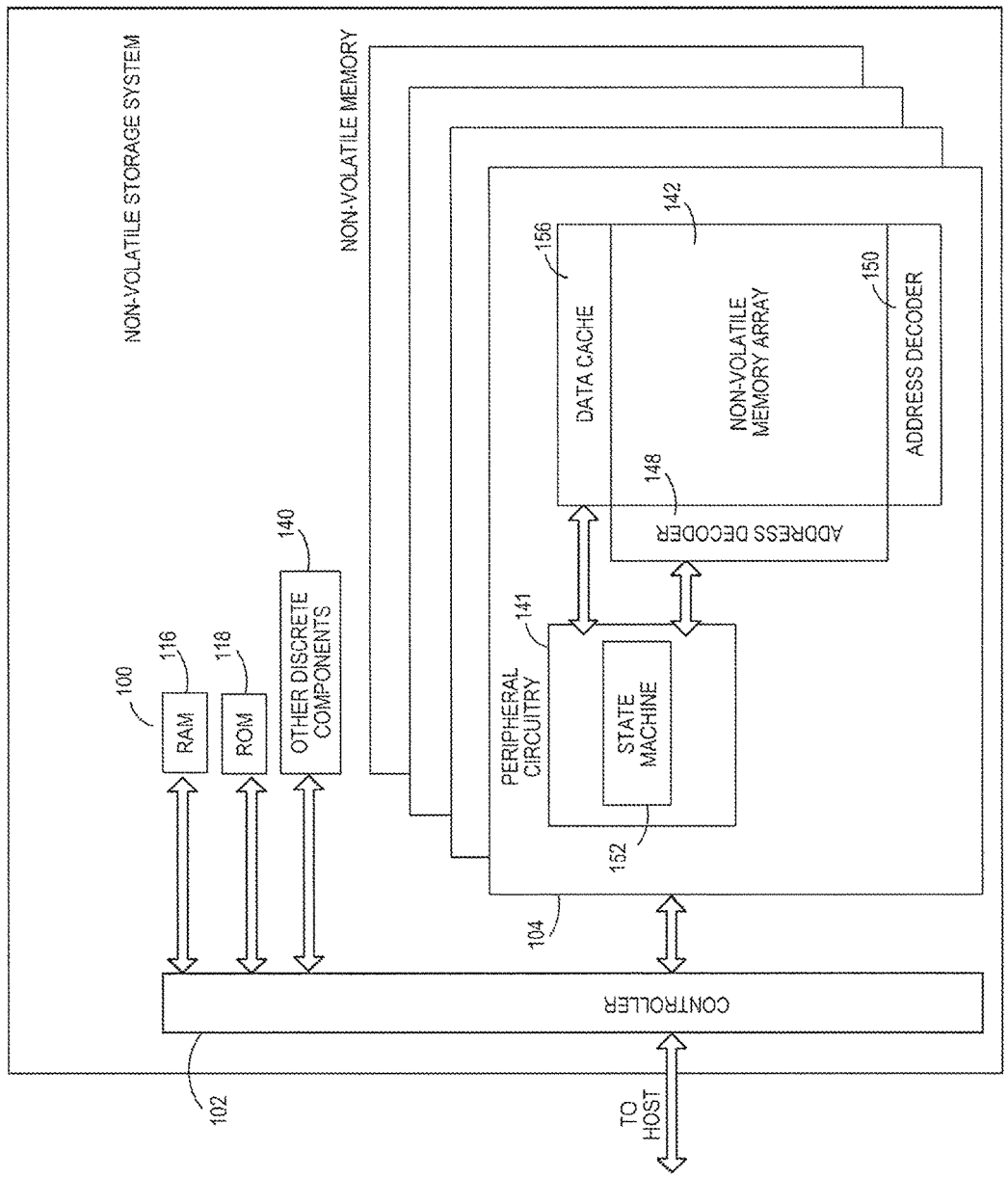
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
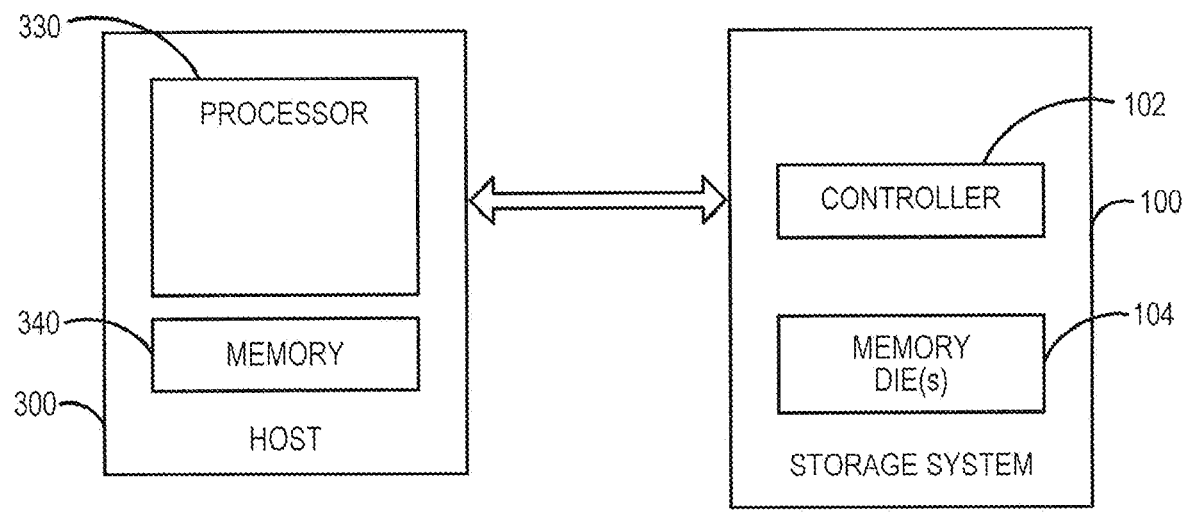
FIG. 3 is a block diagram of a host and storage system of an embodiment.

Turning again to the drawings, FIG. 3 is a block diagram of a host 300 and storage system 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

Due to the continuous evolution of mobile computing infrastructure, there is an ever-growing need for higher performance and higher capacity by the applications running on such computing platforms (hosts). Various host interfaces can be used to address this. For example, the SD Express interface caters to such requirements by incorporating a PCIe interface along with a legacy SD interface. The addition of PCIe technology and the NVMe protocol helps achieve speeds of up to 985 megabytes (MB) per second. Thus, it allows the storage system (e.g., a memory card) to provide a seamless experience to the applications that generate and access large amount of data.

However, typically, a host makes a one-time selection of the interface and protocol during initialization. For example, an SD express host can initialize a memory card in either SD Mode or PCIe mode depending on the interface supported by the host. This may be fine if the host only supports a single host interface. However, when the host is capable of supporting multiple host interfaces, a one-time selection becomes a restriction. Currently, there is no available mechanism for changing the host interface used by a storage system after the initial selection of the host interface (e.g., in middle of an operation depending on application needs).

The following embodiments address this need by allowing a host to choose to change the host interfaces on-the-fly (e.g., from SD to PCIe, or vice versa) after an initial selection of the host interface (e.g., during the operation of the storage system).

Figure 4:
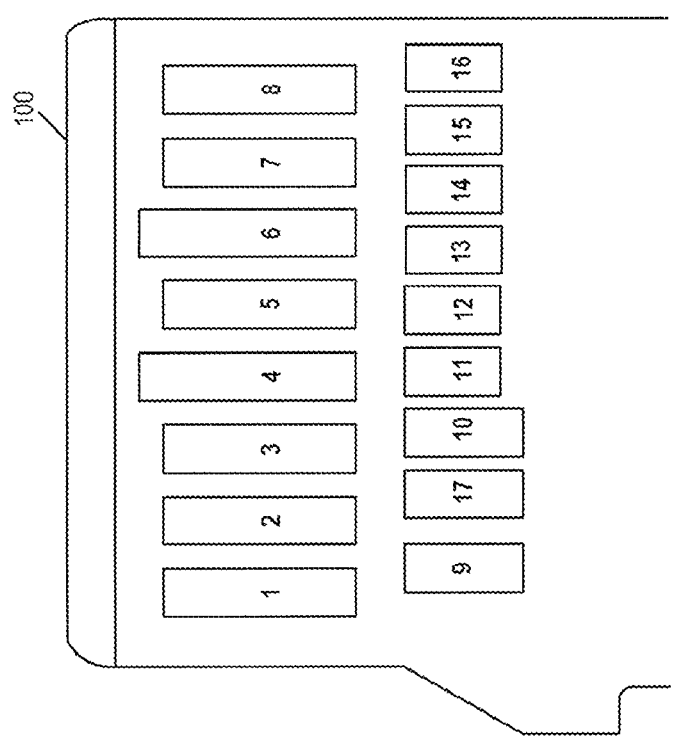
FIG. 4 is a diagram of a memory card of an embodiment.

As a starting point, the physical interface/connector of the storage system 100 of this embodiment is compatible with both host interfaces. For example, consider the situation in which the storage system 100 takes the form of a memory card that has an SD Express card pin assignment (see FIG. 4). For the card to operate in basic SD mode, the SD bus typically requires signals from the first row of pins: CLK, CMD, DAT0, VDD, and VSS. An SD Express card also supports PCIe Gen 3 on a single lane. In order to support the PCIe interface, the SD bus contact pins 7 and 8 are used for REFCLK, and contact pins 9 and 1 are used for CLKREQ# and PERST#, respectively. Thus, the pin assignment for SD mode and PCIe mode are clearly defined in the SD Express specification, and there is no overlap/ambiguity.

In one embodiment, the host 300 is capable of both SD and PCIe interfaces and can seamlessly switch between the two interfaces any time. The decision to choose the interface and make the switch lies solely with the host 300 and the application running on the host 300. It should be understood that while SD and PCIe interfaces are used in these examples, any suitable type of host interface can be used with these embodiments.

Figure 5:
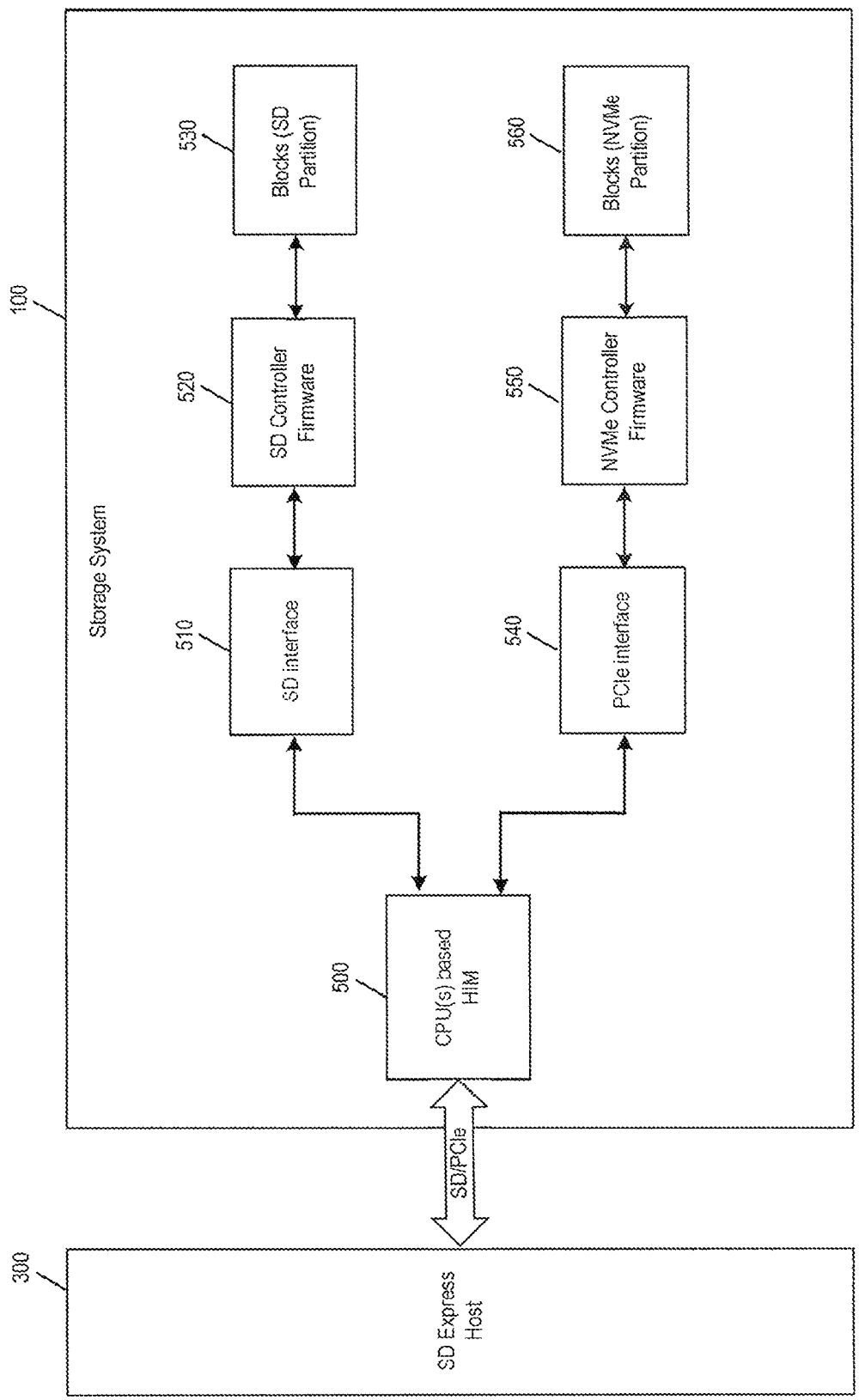
FIG. 5 is a block diagram of a storage system of an embodiment.

Turning again to the drawings, FIG. 5 is a block diagram of a storage system 100 of an embodiment. As shown in FIG. 5, the storage system 100 comprises a processor-based host interface module (HIM) 500. The HIM 500 has two data paths: one for a first host interface (here, an SD interface 510) and the other for a second host interface (here, a PCIe interface 540). Each path is associated with its own firmware 520, 550 to configure the controller 102, as well as different partitions blocks 530, 560 of memory 104. Again, it should be understood that while SD and PCIe are used in this example as two types of host interfaces, other (and more) host interfaces can be used, and these embodiments and the following claims are not limited to any specific host interface unless expressly recited therein.

In operation, in one embodiment, upon insertion of the memory card 100, the host 300 initializes the card 100 to SD mode. The host 300 then checks if the memory card 100 supports PCIe mode. The host 300 can do this, for example, by sending a command over the SD interface. If the memory card 100 supports PCIe mode, the host 300 can proceed with switching to PCIe mode. In the middle of operations in the PCIe mode and depending on host/application requirements, the host 300 can choose to dynamically switch between the PCIe and SD interfaces on-the-fly. In one embodiment whenever the host 300 wants to switch the interface, it sends out a vendor-specific command on the currently-used protocol and interface and requests the switch. The memory card 100 can acknowledge this switch and prepare itself for the change in interface.

The memory card 100 can be made capable of loading the corresponding firmware modules and configure the hardware internet protocols (IPs) on-the-fly based on the host interface selected.

The host 300 can decide to switch host interfaces for many reasons. For example, the host 300 can run a variety of applications that have their own performance and capacity needs. Advanced applications involving high-resolution videos, three-dimensional games, virtual reality, live streaming, etc., may prefer to use PCIe for better performance and higher bandwidth. Thus, the host 300 can choose to switch to PCIe mode when the application demands. However, always using PCIe mode may have downsides in terms of power consumption and thermal parameters, as PCIe operates at a much higher frequency. So, the host 300 has the flexibility to revert back to regular SD mode and save power when feasible. Thus, with these embodiments, the host 300 can intelligently switch between the interfaces after considering various factors, such as, but not limited to, bandwidth needed by an application, power consumption requirements, whether any computationally-intensive operations are being performed, etc.

Figure 6:
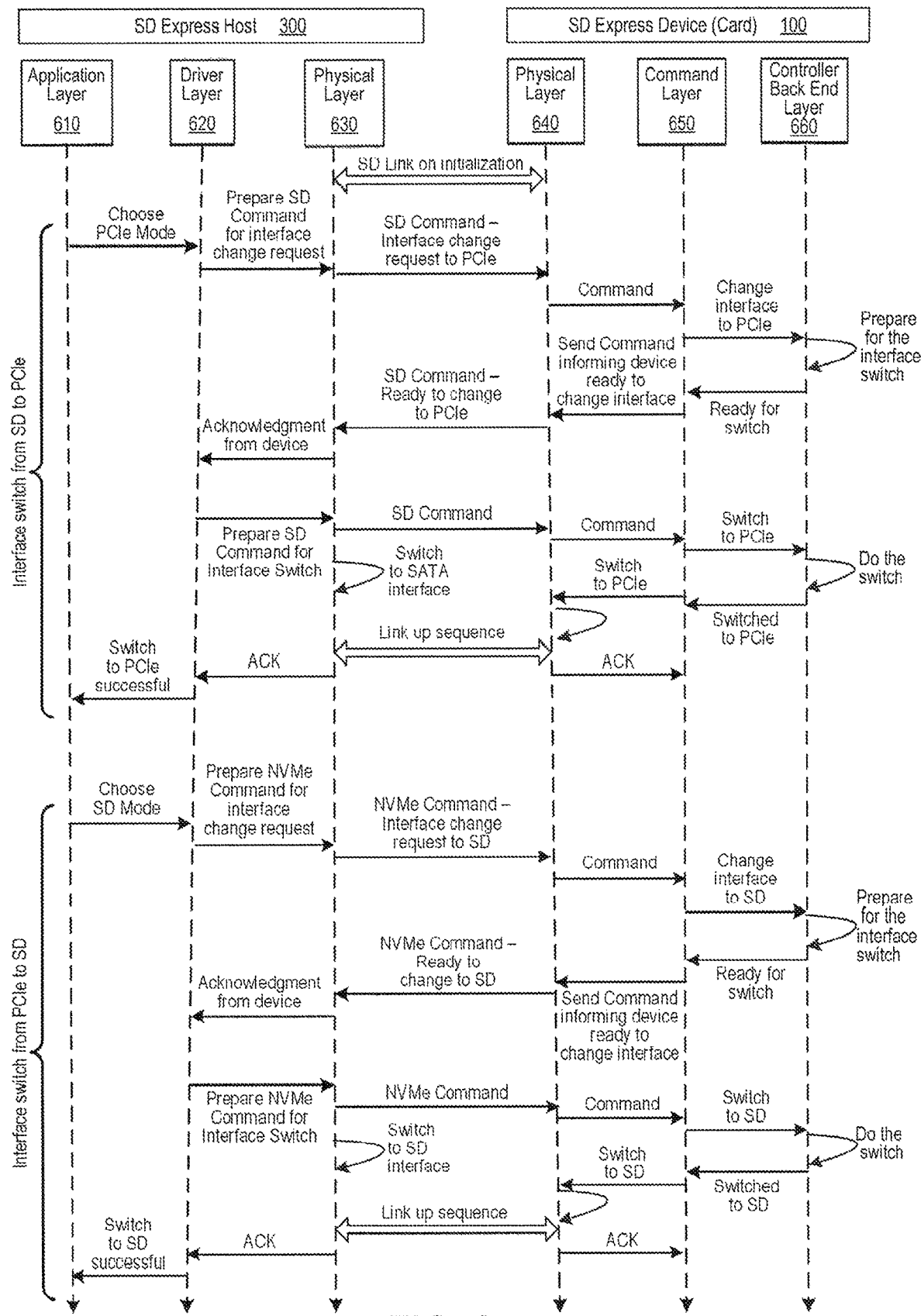
FIG. 6 is a flow diagram of a method of an embodiment for dynamic selection of a host interface.

Turning again to the drawings, FIG. 6 is a flow diagram of a method of an embodiment for using a dual-interface storage system. In this example, the host 300 comprises an application layer 310, a driver layer 320, and a physical layer 330, and the storage system 100 comprises a physical layer 610, a command layer 620, and a controller back-end layer 630. FIG. 6 shows the various interactions among these components to switch between the two host interfaces.

There are several advantages associated with these embodiments. For example, these embodiments can provide efficient power usage. The host 300 can decide to switch to SD mode when it wants to save more power (e.g., when the host 300 is on low battery or where power saving is of high priority). Also, depending on the application accessing the storage system 100, the host 300 can intelligently decide whether the application needs high-speed PCIe. If not, the host 300 can choose to switch to SD and get some additional power savings. Additionally, a single memory card can manage the partitions for both SD and NVMe modes and operate on the data written across modes. All of this means that a user does not have to use different SD cards for different applications Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
a memory; and
a controller configured to:
implement a first host interface upon establishing communication with a host;
after the first host interface has been implemented, receive, from the host via the first host interface, a command to prepare for a switch from the first host interface to a second host interface;
in response to receiving the command to prepare for the switch load firmware to execute on the controller to implement the second host interface;
send an acknowledgement to the host that the storage system is prepared for the switch;
receive, from the host via the first host interface, a command to switch from the first host interface to the second host interface; and
in response to receiving the command to switch, implement the second host interface.

2. The storage system of claim 1, further comprising a host interface module configured to receive, from the host, the commands to prepare and switch.

3. The storage system of claim 1, wherein the controller is further configured to partition the memory into a first set of blocks allocated for the first host interface.

4. The storage system of claim 3, wherein the controller is further configured to partition the memory into a second set of blocks allocated for the second host interface.

5. The storage system of claim 1, wherein the memory comprises a three-dimensional memory.

6. The storage system of claim 1, wherein the controller is further configured to complete an in-progress memory operation using the first host interface before implementing the second host interface.

7. The storage system of claim 1, wherein:
one of the first and second host interfaces comprises a Secure Digital (SD) interface; and
the other of the first and second host interfaces comprises a peripheral component interconnect express (PCIe) interface.

8. The storage system of claim 1, further comprising a connector compatible with the first and second host interfaces.

9. The storage system of claim 1, wherein the controller is further configured to switch between the first and second host interfaces a plurality of times.

10. The storage system of claim 1, wherein the command to prepare comprises a vendor-specific command.

11. The storage system of claim 1, wherein the host comprises an application layer, a driver layer, and a physical layer.

12. The storage system of claim 11, wherein the storage system comprises a physical layer, a command layer, and a controller back-end layer.

13. A method comprising:
performing the following in a host:
establishing communication with a storage system comprising a memory, wherein a first host interface is implemented by the storage system upon establishing communication;
sending, to the storage system via the first host interface, a command to prepare for a switch from the first host interface to a second host interface, wherein the storage system loads firmware to implement the second host interface in response to receiving the command to prepare for the switch;
receiving an acknowledgement from the storage system that the storage system is prepared for the switch;
sending, to the storage system via the first host interface, a command to switch from the first host interface to the second host interface; and
receiving an acknowledgement from the storage system that the storage system has implemented the second host interface.

14. The method of claim 13, wherein:
one of the first and second host interfaces comprises a Secure Digital (SD) interface; and
the other comprises a peripheral component interconnect express (PCIe) interface.

15. The method of claim 13, wherein the command to prepare comprises a vendor-specific command.

16. The method of claim 13, wherein the host determines to send the command to prepare based on power usage.

17. The method of claim 13, wherein the host determines to send the command to prepare based on bandwidth.

18. The method of claim 13, further comprising sending commands to switch between the first and second host interfaces a plurality of times.

19. The method of claim 13, wherein:
the host comprises an application layer, a driver layer, and a physical layer; and
the storage system comprises a physical layer, a command layer, and a controller back-end layer.

20. A storage system comprising:
a memory;
means for implementing a first host interface upon establishing communication with a host;
means for loading firmware to implement a second host interface in response to receiving, from the host, a command to prepare for a switch from the first host interface to the second host interface;
means for sending an acknowledgement to the host that the storage system is prepared for the switch; and
means for implementing the second host interface in response to receiving, from the host, a command to switch from the first host interface to the second host interface.

* * * * *